United States Patent
Huang

(10) Patent No.: US 11,288,181 B2
(45) Date of Patent: Mar. 29, 2022

(54) FLASH MEMORY INITIALIZATION SCHEME FOR WRITING BOOT UP INFORMATION INTO SELECTED PAGES AVERAGELY AND RANDOMLY DISTRIBUTED OVER MORE PAGES AND CORRESPONDINGLY METHOD FOR READING BOOT UP INFORMATION FROM SELECTED PAGES

(71) Applicant: Silicon Motion Inc., Hsinchu County (TW)

(72) Inventor: Sheng-Yuan Huang, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 105 days.

(21) Appl. No.: 16/294,935

(22) Filed: Mar. 7, 2019

(65) Prior Publication Data
US 2020/0285572 A1 Sep. 10, 2020

(51) Int. Cl.
*G06F 12/02* (2006.01)
*G06F 7/58* (2006.01)
*G06F 17/16* (2006.01)
*G06F 9/4401* (2018.01)

(52) U.S. Cl.
CPC .......... *G06F 12/0246* (2013.01); *G06F 7/588* (2013.01); *G06F 9/4401* (2013.01); *G06F 12/0207* (2013.01); *G06F 17/16* (2013.01)

(58) Field of Classification Search
CPC ............. G06F 12/0246; G06F 12/0238; G06F 3/0679; G06F 3/0688; G06F 12/0207; G06F 7/588; G06F 7/582; G06F 17/16
See application file for complete search history.

(56) References Cited

U.S. PATENT DOCUMENTS 5,701,492 A * 12/1997 Wadsworth ............... G06F 8/65
 711/103
5,745,459 A 4/1998 Inokuchi
(Continued)

FOREIGN PATENT DOCUMENTS

TW I351643 11/2011
TW 201214121 4/2012

OTHER PUBLICATIONS

NAND Flash 101: An Introduction to NAND Flash and How to Design It In to Your Next Product by Micron (Year: 2006).*
(Continued)

*Primary Examiner* — Paul M Knight
(74) *Attorney, Agent, or Firm* — Winston Hsu

(57) ABSTRACT

A method used by a flash memory initialization device for writing boot up information into a memory device including a controller and a flash memory includes: generating the boot up information; generating N block indices by calling a random function based on a first seed; generating M page indices for each of the N block indices; combining the M page indices with each of the N block indices to generate M×N candidate row addresses; and writing the boot up information from the flash memory initialization device into the flash memory by controlling the controller to write the boot up information into M pages belonging to at least one block sequentially based on the M×N candidate row addresses.

18 Claims, 4 Drawing Sheets

(56) References Cited

U.S. PATENT DOCUMENTS

| | | | | |
|---|---|---|---|---|
| 6,330,634 B1* | 12/2001 | Fuse | ............... | G06F 11/1417 711/103 |
| 6,426,893 B1* | 7/2002 | Conley | ............... | G06F 12/0246 365/185.09 |
| 8,665,648 B2* | 3/2014 | Mun | ............... | G11C 16/0483 365/185.18 |
| 10,289,321 B1* | 5/2019 | Baryudin | ............... | G06F 3/0619 |
| 2005/0120146 A1* | 6/2005 | Chen | ............... | G06F 13/28 710/22 |
| 2007/0250719 A1* | 10/2007 | Lai | ............... | G06F 12/1408 713/190 |
| 2009/0138754 A1* | 5/2009 | Edwards | ............... | G06F 11/1068 714/6.11 |
| 2011/0066787 A1* | 3/2011 | Markey | ............... | G06F 21/572 711/103 |
| 2011/0072199 A1* | 3/2011 | Reiter | ............... | G06F 12/0246 711/103 |
| 2012/0030530 A1* | 2/2012 | Chuchem | ............... | G06F 11/263 714/719 |
| 2013/0097403 A1* | 4/2013 | Zheng | ............... | G06F 12/1036 711/206 |
| 2015/0280749 A1* | 10/2015 | Gjorup | ............... | G06F 11/1072 714/752 |
| 2016/0028544 A1* | 1/2016 | Hyde | ............... | G06F 3/0637 380/44 |
| 2017/0206030 A1* | 7/2017 | Woo | ............... | G06F 3/0655 |
| 2019/0179543 A1* | 6/2019 | Sharon | ............... | G11C 16/3427 |
| 2020/0167290 A1* | 5/2020 | Oh | ............... | G06F 12/10 |

OTHER PUBLICATIONS

Boot-from-NAND Using Micron® MT29F1G08ABB NAND Flash with the Texas Instruments™ (TI) OMAP2420 Processor by Micron (Year: 2006).*

Wikipedia Wear Leveling; Feb. 2019 Version (Year: 2019).*

Errors in Flash-Memory-Based Solid-State Drives: Analysis, Mitigation, and Recovery by Yu (Year: 2018).*

Office Action dated Jan. 27, 2021 for the TW Application No. 109100001, dated Jan. 2, 2020, pp. 1-7.

* cited by examiner

FLASH MEMORY INITIALIZATION SCHEME FOR WRITING BOOT UP INFORMATION INTO SELECTED PAGES AVERAGELY AND RANDOMLY DISTRIBUTED OVER MORE PAGES AND CORRESPONDINGLY METHOD FOR READING BOOT UP INFORMATION FROM SELECTED PAGES

BACKGROUND OF THE INVENTION

1. Field of the Invention

The invention relates to a scheme of initializing a flash memory, and more particularly to a method used by a flash memory initialization device, a controller to be used in a memory device, and a method utilized in the controller to be used in the memory device.

2. Description of the Prior Art

Generally speaking, a flash memory device comprises a controller and a flash memory wherein the controller when powered needs to successfully read boot up information from the flash memory before a timer expires so as to use the boot up information to retrieve firmware from the flash memory. The boot up information may be stored in a particular block of the flash memory. However, if the flash memory becomes a downgraded product and the particular block is a bad block of the flash memory, the memory device will fail.

A conventional method may be arranged to store the boot up information into fixed pages in one or more blocks when initializing the flash memory and to read the boot up information from the fixed pages when the controller is powered. For example, the conventional method is arranged to store the boot up information into the pages which are separated by a fixed number of pages such as 64 pages in one block. If the controller merely tries to read the boor up information from the flash memory for at most 512 times before the timer expires, the controller only checks whether the boot up information is stored in 256 consecutive blocks of the flash memory when one block has 128 pages. However, if one block has 4096 pages, the controller only checks whether the boot up information is stored in 8 consecutive blocks of the flash memory. That is, if the 8 consecutive blocks become bad blocks, then the controller cannot retrieve the boot up information to obtain the firmware and the operation of the controller and memory device will fail. Thus, the conventional method cannot be applied into a variety of types of flash memories.

SUMMARY OF THE INVENTION

Therefore one of the objectives of the invention is to provide a method used by a flash memory initialization device, a controller to be used in a memory device, and a method utilized in the controller to be used in the memory device, solve the above-mentioned problems.

According to embodiments of the invention, a method used by a flash memory initialization device is disclosed. The flash memory initialization is used for writing boot up information into a memory device including a controller and a flash memory. The method comprises: generating the boot up information at the flash memory initialization device; generating N block indices by setting a first seed and calling a random function based on the first seed wherein the N block indices are randomly distributed from zero to a maximum block index number; generating M page indices for each of the N block indices; correspondingly combining the M page indices with each of the N block indices to generate M×N candidate row addresses; and writing the boot up information from the flash memory initialization device into the flash memory by transmitting the boot up information from the flash memory initialization device to the controller and control the controller to write the boot up information into M pages belonging to at least one block sequentially based on the M×N candidate row addresses.

According to the embodiments, a controller to be used in a memory device is disclosed. The memory device comprises the controller and a flash memory. The controller comprises a read-only memory (ROM) and a processing circuit. The ROM is used for recording a specific program code and a first seed. The processing circuit is coupled to the ROM, and is used for reading the specific program code and the first seed when the controller is powered, and is used for executing the specific program code to: generate N block indices by setting the first seed and calling a random function based on the first seed wherein the N block indices are randomly distributed from zero to a maximum block index number; generate M page indices for each of the N block indices; correspondingly combine the M page indices with each of the N block indices to generate M×N candidate row addresses; sequentially read boot up information from M pages belonging to at least one block based on the M×N candidate row addresses; and, retrieve a firmware program from the flash memory based on the boot up information successfully read out from the at least one block to execute the firmware program.

According to the embodiments, a method utilized in a controller to be used in a memory device further having a flash memory is disclosed. The method comprises: providing a read-only memory (ROM) for recording a specific program code and a first seed; reading the specific program code and the first seed when the controller is powered; and executing the specific program code to: generate N block indices by setting the first seed and calling a random function based on the first seed wherein the N block indices are randomly distributed from zero to a maximum block index number; generate M page indices for each of the N block indices; correspondingly combine the M page indices with each of the N block indices to generate M×N candidate row addresses; sequentially read boot up information from M pages belonging to at least one block based on the M×N candidate row addresses; and retrieve a firmware program from the flash memory based on the boot up information successfully read out from the at least one block to execute the firmware program.

According to the embodiments, the provide scheme is able to generate candidate/golden row addresses which are fewer than a number of row addresses employed by the conventional method and can be distributed averagely and randomly over more pages. For example, the number of row addresses employed by the conventional method may be equal to 130072 if the flash memory has 2048 block each having 4096 pages. Compared to this, the provided scheme may employs merely 6×8×16 row addresses, i.e. 768 row addresses. In addition, the controller after leaving factory can more rapidly retrieve the boot up information to obtain the firmware program when the controller is powered. The whole performance is significantly improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
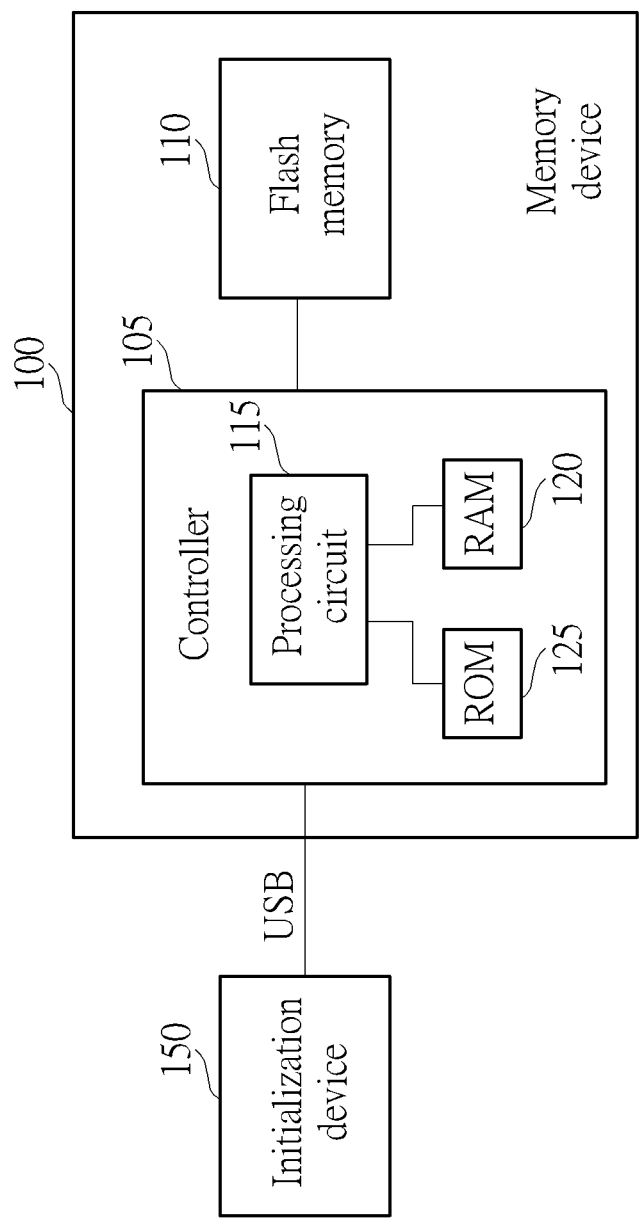
FIG. 1 is a block diagram showing an example of using a flash memory initialization device to write boot up information into a memory device according to an embodiment of the invention.

Refer to FIG. 1, which is a block diagram showing an example of using a flash memory initialization device 150 to write boot up information into a memory device 100 according to an embodiment of the invention. The memory device 100 such as a storage device (e.g. a solid-state drive or a secure digital (SD) memory card (but not limited)) comprises a controller 105 and a flash memory 110. The controller 105 comprises a processing circuit 115, a random access memory (RAM) 120, and a read-only memory (ROM) 125 which records a boot up program code and seed(s) used for calling a random function.

The flash memory initialization device 105 for example is a computer used as an initialization tool device which is used by a memory device manufacturer to load an initialization program to generate boot up information when the manufacturer generates the memory device 100 such as an SD card or SSD. The initialization program and the controller 105 can be provided by a controller manufacturer. The initialization tool device 150 is connected to the memory device 100 via an interface such as USB interface (but not limited).

For instance, after the memory device manufacturer decides the type of a flash memory and selects a corresponding controller, the memory device manufacturer initializes the flash memory 110 by loading and executing the initialization program provided by the controller manufacturer. The initialization program generates the boot up information, and transmits the generated boot up information to the RAM 120 of the controller 115 via the USB interface.

Then the controller 115 transfers and writes the boot up information buffered in the RAM 120 to appropriate block(s) and/or appropriate page(s) of the flash memory 110. That is, the initialization device 150 is arranged to control the controller 105 to write the boot up information into the flash memory 110. The flash memory's block/page location(s) for storing the boot up information, i.e. the appropriate block(s) and/or appropriate page(s), is/are determined by the initialization program running on the initialization tool device 150 according to a specific rule so that the appropriate block (s) and/or appropriate page (s) equivalently can be distributed randomly over all blocks/pages as far as possible. Storing the boot up information into the appropriate block(s) and/or appropriate page(s) distributed randomly as far as possible is to avoid a block become a bad block or data of a page is influenced due to high temperature of a reflow process.

The ROM 125 of controller 105 also records the same specific rule. Thus, after leaving the factory, the processing circuit 115 of the controller 105 can be arranged to successfully read the boot up information from the appropriate block(s) and/or appropriate page(s) in the flash memory 110 based on the same specific rule recorded in the ROM 125 when the memory device 100 is powered. The processing circuit 115 then can read/retrieve and execute a dedicated firmware program from a particular location of the flash memory 110 based on the boot up information. That is, the operation of the initialization program for determining the appropriate block(s) and/or appropriate page(s) is similar to that of controller 105 for finding the appropriate block(s) and/or appropriate page(s).

It should be noted that a block or a page of the flash memory 110 used for recording the boot up information can be referred to as an information block or an information page.

As mentioned above, the procedure employed by the initialization program running on the initialization tool device 150 is arranged to randomly select block(s) and/or page(s) in the flash memory as information block(s) and/or information page(s) equivalently.

In practice, the initialization program is arranged to generate a candidate or golden row address table which is used for recording which row addresses are selected/used as candidate/golden row addresses to store the boot up information into at least one block corresponding to at least one of the candidate row addresses. The initialization program is used to determine the candidate row addresses so that the candidate row addresses can be randomly distributed over blocks and over pages.

It should be noted that a row address is formed or combined by a block index and a page index. The number of total/all row addresses is determined by a total block number and a total page number in each block. For example, the block index ranges from zero to the total block number minus one, and the page index ranges from zero to the total page number minus one.

To cover and support different types of flash memories which may have different total block numbers wherein each block may have different total page numbers, e.g. 128, 256, 512, 1024, 2048, or 4096 pages (but not limited), the initialization program is used for generating enough candidate row addresses in the table so that the boot up information can be successfully written into at least one block at location(s) distributed randomly over all blocks for each of different types of flash memories. Thus, if the flash memory 110 is a downgraded flash memory such as a flash memory having half consecutive bad blocks, the boot up information can still be successfully written into at least one block.

In one embodiment, suppose that the flash memory 110 may comprise the total block number is equal to the value NB wherein NB may be equal to 2048 and the minimum of total page number in each block is equal to 128; that is, the flash memory 110 comprises 2048 blocks each may have 128, 256, 512, 1024, 2048, or 4096 pages in different examples. However, this is not meant to be a limitation.

For the design of 2048 blocks each having 128 pages, the initialization program is arranged to averagely classify or divide row addresses in a range from 0 to 128×2048 (i.e. $2^{18}$) into N block groups each having a plurality of consecutive row addresses according to the integer of N which is greater than 1. For instance, the integer N may be equal to 16 (but not limited), and the initialization program classifies the row addresses into 16 block groups each having 16384 (i.e. $2^{14}$) consecutive row addresses respectively corresponding to different pages. The initialization program equivalently classifies 2048 blocks into 16 block groups each having 128 consecutive blocks each having 128 consecutive pages.

For each of the N block groups (e.g. 16 block groups), the initialization program is used to generate a block random integer to as a block index which is associated with 128 consecutive pages in a block. For example, a block random integer ranging from zero to 127 is generated for a first block group, and a block random integer ranging from 128 to 255 is generated for a second block group, and so on.

After obtaining N block indices, the initialization program is used to select 128 pages of a corresponding block according to a corresponding block index for each block group and then to generate M page random integers as M page indices for the selected 128 pages. Thus the initialization program generates the N block indices and the M page indices and then is arranged to determine N×M row addresses as the candidate row addresses based on the N block indices and the M page indices corresponding to each block random integer. Accordingly, the N×M candidate row addresses are averagely and randomly distributed over blocks and over pages.

In practice, for generating the N×M candidate row addresses in the first round for the design of 128 pages in one block, the initialization program sets a seed RS1 to sequentially generate the N block indices represented by $a_{11}$, $a_{12}, \ldots, a_{1N}$ which equivalently are used for indicating selections of corresponding blocks and can be represented by the following relations:

$$0 \leq a_{11} < \frac{NB}{N}$$
$$\frac{NB}{N} \leq a_{12} < \frac{NB}{N} \times 2 - 1$$
$$\ldots$$
$$\frac{NB}{N} \times (N-1) \leq a_{1N} < NB$$

Wherein the block index $a_{11}$ is randomly selected from a range from zero to $$\frac{NB}{N} - 1,$$

the block index $a_{12}$ is randomly selected from a range from $$\frac{NB}{N}$$

to $$\left(\frac{NB}{N} \times 2\right) - 1, \ldots,$$

and the block index $a_{1N}$ is randomly selected from a range from $$\frac{NB}{N} \times (N-1) \text{ to } NB.$$

For example, NB is equal to 2048, and $$\frac{NB}{N} - 1$$

is equal to 127. The block index $a_{11}$ is randomly determined among a range from zero to 127, and similarly other block indices are determined based on the above relations.

In addition, the initialization program is executed to ensure that the blocks corresponding to the block indices are averagely distributed or located in different planes. For example, if N is equal to 16 and the flash memory 110 comprises four planes, then the initialization program is used to finely modify a portion of the block indices $a_{11}$, $a_{12}, \ldots, a_{1N}$ so as to make the N blocks corresponding to these block indices $a_{11}, a_{12}, \ldots, a_{1N}$ be located indifferent four planes respectively. For example, N is equal to 16, and each of the four planes comprises four blocks which are selected as candidates of information block(s) by the initialization program.

In practice, the initialization program is arranged to perform a modulo operation for the block indices $a_{11}$, $a_{12}, \ldots, a_{1N}$. For example, if the reminders generated by the modulo operation performed for $a_1$, $a_{12}$, and $a_{13}$ according to the divisor 4 are respectively equal to 2, 0, 0, then the initialization program may be used to modify the value of $a_{11}$ as the value of $a_{11}$ minus one and modify the value of $a_{13}$ as the value of $a_{13}$ minus one. It is not needed to modify the value of $a_{12}$. Thus, the initialization program can make the blocks corresponding to the modified block indices $a_{11}$, $a_{12}$, and $a_{13}$ be located in different planes since the reminders generated by the modulo operation performed for the modified block indices $a_{11}$, $a_{12}$, and $a_{13}$ according to the divisor 4 are different, i.e. 1, 0, and 3. This example is merely illustrative purposes and is not intended to be a limitation. Also, performing the modulo operation for the integers is not meant to be a limitation.

For each block index, after determining a block corresponding to a specific block index, the initialization program is executed to determine a portion of pages in the block to store the boot up information wherein the portion of pages are randomly located in such block. The initialization program equivalently is used to classify the total pages in the block into M page groups and respectively and randomly select one page from each page group to determine M pages which are randomly distributed wherein M may be equal to 8 (but not limited).

In practice, the initialization program is used to employ and set a seed RS2 to generate M page indices represented by $x_{11}, x_{12}, \ldots, x_{1M}$ which are used for indicating selections of corresponding page numbers and can be represented by the following relations:

$$0 \leq x_{11} < \frac{2^n}{M}$$
$$\frac{2^n}{M} \leq x_{12} < \frac{2^n}{M} \times 2$$
$$\ldots$$
$$\frac{2^n}{M} \times (M-1) \leq x_{1M} < \frac{2^n}{M} \times M$$

Wherein the page index $x_{11}$ is randomly selected from a range from zero to $$\frac{2^n}{M} - 1,$$

page index $x_{12}$ is randomly selected from a range from $$\frac{2^n}{M}$$

to $$\left(\frac{2^n}{M} \times 2\right) - 1, \ldots,$$

and page index $x_{1N}$ is randomly selected from a range from $$\frac{2^n}{M} \times (M-1)$$

to $2^n$. For example, $2^n$ means a minimum total page number of each block in the flash memory 110 and is equal to 128 (i.e. n is equal to 7), and $$\frac{2^n}{M} - 1$$

is equal to 15. In one embodiment, the total page number of each block for different types of flash memories may be 128, 256, 512, 1024, 2048, and 4096 (but not limited); that is, the minimum total page number of a block is equal to 128, and the maximum total page number of a block is equal to 4096. The page index $x_1$ is randomly determined among a range from zero to 15, and similarly other page indices are determined based on the above relations.

Accordingly, in the first round for the design of each block having 128 pages, the initialization program generates the block indices $a_{11}, a_{12}, \ldots, a_{1N}$ and the page indices $x_{111}, x_{112}, \ldots, x_{11M}, x_{121}, x_{122}, \ldots, x_{12M}, \ldots, x_{1N1}, x_{1N2}, \ldots, x_{1NM}$, and thus can generate the N×M candidate row addresses by combining the block indices and corresponding page indices. The N×M candidate row are represented by the following relations:

$$a_{11} \times 2^n + \begin{cases} x_{11M}, \frac{2^n}{M} \times (M-1) \le x_{11M} < \frac{2^n \times M}{M} \\ \ldots \\ \ldots \\ x_{112}, \frac{2^n}{M} \le x_{112} < \frac{2^n \times 2}{M} \\ x_{111}, 0 \le x_{111} < \frac{2^n}{M} \end{cases}$$

$$a_{12} \times 2^n + \begin{cases} x_{12M}, \frac{2^n}{M} \times (M-1) \le x_{12M} < \frac{2^n \times M}{M} \\ \ldots \\ \ldots \\ x_{122}, \frac{2^n}{M} \le x_{122} < \frac{2^n \times 2}{M} \\ x_{121}, 0 \le x_{121} < \frac{2^n}{M} \end{cases}$$

...

$$a_{1N} \times 2^n + \begin{cases} x_{1NM}, \frac{2^n}{M} \times (M-1) \le x_{1NM} < \frac{2^n \times M}{M} \\ \ldots \\ \ldots \\ x_{1N2}, \frac{2^n}{M} \le x_{1N2} < \frac{2^n \times 2}{M} \\ x_{1N1}, 0 \le x_{1N1} < \frac{2^n}{M} \end{cases}$$

It should be noted that the results of setting the same seed RS1 to call a random function to sequentially generate a set of random integers as block indices for multiple times are identical to the random integers generated for the first time based on the same seed RS1 if the seed RS1 is not reset. That is, the results of using the seed RS1 to generate a set of random integers as block indices for multiple times are identical to a set of $a_{11}, a_{12}, \ldots, a_{1N}$. Thus, after leaving the factory, the controller 105 can still generate the same $a_{11}, a_{12}, \ldots, a_{1N}$ as the block indices based on the same seed RS1.

Similarly, the results of setting the same seed RS2 to call a random function to sequentially generate a set of random integers as page indices for multiple times are identical to the random integers generated for the first time based on the same seed RS2 if the seed RS2 is not reset. That is, the results of using the seed RS2 to generate a set of random integers as page indices for multiple times are identical to a set of $x_{111}, x_{112}, \ldots, x_{11M}, x_{121}, x_{122}, \ldots, x_{12M}, \ldots, x_{1N1}, x_{1N2}, \ldots, x_{1NM}$. Thus, after leaving the factory, the controller 105 can still generate the same $x_{111}, x_{112}, \ldots, x_{11M}, x_{121}, x_{122}, \ldots, x_{12M}, \ldots, x_{1N1}, x_{1N2}, \ldots, x_{1NM}$ as the page indices based on the same seed RS2.

It is noted that the same or similar rule employed by the initialization program running on the initialization tool device 150 is also recorded in the ROM 125 of controller 105. Thus, after leaving the factory, the controller 105 when powered can also generate the same candidate row addresses and sequentially use one candidate row address among the candidate row addresses to retrieve the boot up information from one corresponding page so as to obtain the firmware program based on the boot up information.

After generating the N×M candidate row addresses, the initialization program is used to sequentially use M candidate row addresses corresponding to one block in the N×M candidate row addresses to write the boot up information into M pages associated with the M candidate row addresses and then reads data from pages of the M candidate row addresses to check whether the boot up information is successfully written into the pages. For example, the initialization program transmits the boot up information to the controller 105 and controls the processing circuit 115 of controller 105 to write the boot up information into pages associated with the candidate row addresses $$a_{11} \times 2^n + \begin{cases} x_{11M}, \frac{2^n}{M} \times (M-1) \leq x_{11M} < \frac{2^n \times M}{M} \\ \cdots \\ \cdots \\ x_{112}, \frac{2^n}{M} \leq x_{112} < \frac{2^n \times 2}{M} \\ x_{111}, 0 \leq x_{111} < \frac{2^n}{M} \end{cases}.$$

If the block is a bad block and the boot up information is not successfully written into the pages, then the initialization program controls the processing circuit 115 of controller 105 to write the boot up information into pages associated with the candidate row addresses $$a_{12} \times 2^n + \begin{cases} x_{12M}, \frac{2^n}{M} \times (M-1) \leq x_{12M} < \frac{2^n \times M}{M} \\ \cdots \\ \cdots \\ x_{122}, \frac{2^n}{M} \times x_{122} < \frac{2^n \times 2}{M} \\ x_{121}, 0 \leq x_{121} < \frac{2^n}{M} \end{cases}.$$

The initialization program does not control the processing circuit 115 of controller 105 to write the boot up information into pages until the boot up information is successfully written. This example is not meant to be a limitation. In one embodiment, the initialization program can control the processing circuit 115 of controller 105 to write the boot up information into pages of two or more blocks based on the above-mentioned candidate row addresses.

Thus, for the controller 105, after receiving the boot up information from the initialization tool device 150, the processing circuit 115 is arranged to temporarily store the boot up information in the RAM 120 and then to write the boot up information into a block based on the candidate row addresses determined by and sent from the initialization program running on the initialization tool device 150.

In addition, in one embodiment, the initialization program is executed to ensure that the randomly selected page indices $x_{111}, x_{112}, \ldots, x_{11M}, x_{121}, x_{122}, \ldots, x_{12M}, \ldots, x_{1N1}, x_{1N2}, \ldots, x_{1NM}$ can be arranged by one arrangement of odd page indices separated by even page indices. The initialization program is used to finely adjust a portion of $x_{111}, x_{112}, \ldots, x_{11M}, x_{121}, x_{122}, \ldots, x_{12M}, \ldots, x_{1N1}, x_{1N2}, \ldots, x_{1NM}$. For example, if the page indices $x_{111}, x_{112},$ and $x_{113}$ are respectively equal to 10, 34, and 80, the initialization program for example is arranged to modify the integer $x_{111}$ as 9 and the integer $x_{113}$ as 79. This example however is not intended to be a limitation.

It should be noted that the randomly selected page indices $x_{111}, x_{112}, \ldots, x_{11M}, x_{121}, x_{122}, \ldots, x_{12M}, \ldots, x_{1N1}, x_{1N2}, \ldots, x_{1NM}$ mentioned above are determined by the initialization program for the type of flash memory 110 having blocks each having a minimum page number such as 128 pages.

In other embodiments, to cover different types of flash memories having blocks having different sizes of page numbers, the initialization program is arranged to generate more candidate row addresses so that the selections for storing the boot up information can be averagely and randomly distributed over all the pages in one block. This avoids the risk of data corruption at high reflow temperatures. Also, the controller 105 can generate the identical candidate row addresses based on the same rule so as to correctly retrieve one copy of the boot up information from at least one page so as to retrieve and activate the firmware program.

For example, in one embodiment, the initialization program is arranged to generate more and enough candidate row addresses to cover different types of flash memories having blocks having different sizes of page numbers such as a maximum total page number 4096 (but not limited). For block indices, the initialization program is arranged to set the seed RS1 and then call the random function to sequentially generate K×N block indices represented by $a_{11}, a_{12}, \ldots, a_{1N}, a_{21}, a_{22}, \ldots, a_{2N}, \ldots, a_{k1}, a_{k2}, \ldots, a_{kN}$ which equivalently are used for indicating selections of corresponding blocks and can be represented by the following relations:

$$0 \leq a_{11} < \frac{NB}{N}$$

$$\frac{NB}{N} \leq a_{12} < \frac{NB}{N} \times 2 - 1$$

$$\cdots$$

$$\frac{NB}{N} \times (N-1) \leq a_{1N} < NB$$

$$\cdots$$

$$0 \leq a_{21} < \frac{NB}{N}$$

$$\frac{NB}{N} \leq a_{22} < \frac{NB}{N} \times 2 - 1$$

$$\cdots$$

$$\frac{NB}{N} \times (N-1) \leq a_{2N} < NB$$

$$\cdots$$

$$0 \leq a_{k1} < \frac{NB}{N}$$

$$\frac{NB}{N} \leq a_{k2} < \frac{NB}{N} \times 2 - 1$$

$$\cdots$$

$$\frac{NB}{N} \times (N-1) \leq a_{kN} < NB$$

wherein the value k for example is equal to 5 since 4096 divided by 128 is equal to 32 which is $2^5$; however, this is not meant to be a limitation. The value of k for example ranges from 2 to an integer corresponding to the maximum total page number comprised by a block; the integer corresponding to the maximum total page number for instance is equal to 5 if the maximum total page number is equal to 4096.

For page indices, the initialization program is arranged to set the seed RS2 and then call the random function to sequentially generate M page indices for each block index correspondingly wherein the k×N×M page indices $x_{111}, x_{112}, \ldots, x_{11M}, x_{121}, x_{122}, \ldots, x_{12M}, \ldots, x_{1N1}, x_{1N2}, \ldots, x_{1NM}, \ldots,$ and $x_{k11}, x_{k12}, \ldots, x_{k1M}, x_{k21},$ $x_{k22}, \ldots, x_{k2M}, \ldots, x_{kN1}, x_{kN2}, \ldots, x_{kNM}$ can be represented by the following relations:

$$\frac{2^n}{M} \times (j-1) \leq x_{1ij} < \frac{2^n}{M} \times j, \ i = 1, 2, \ldots, N \text{ and } j = 1, 2, \ldots, M$$

$$\frac{2^{n+1}}{M} \times (j-1) \leq x_{2ij} = x_{1ij} \times 2 + SN_{1j} < \frac{2^{n+1}}{M} \times j, \ i = 1, 2, \ldots, N$$

$$\text{and } j = 1, 2, \ldots, M$$

$$\ldots$$

$$\frac{2^{n+(k-1)}}{M} \times (j-1) \leq x_{kij} = x_{1ij} \times k + SN_{(k-1)j} < \frac{2^{n+(k-1)}}{M} \times j,$$

$$i = 1, 2, \ldots, N \text{ and } j = 1, 2, \ldots, M \text{ and } k = 3, \ldots, K$$

Wherein K for example is equal to 5 if the maximum total page number is equal to 4096.

In one embodiment, if each of blocks in flash memory 110 has 256 pages, then the initialization program is arranged to use the page indices page indices $x_{111}, x_{112}, \ldots, x_{11M}, x_{121}, x_{122}, \ldots, x_{12M}, \ldots, x_{1N1}, x_{1N2}, \ldots, x_{1NM}$ to sequentially generate M page for each of N block indices respectively. $SN_{1j}$ means a list of serial numbers for example starting from 1; for example, $SN_{11}$ is equal to 1, $SN_{12}$ is equal to 2, $SN_{13}$ is equal to 3, and so on. Accordingly, for the design of $128 \times 2^{(k-1)}$ pages, if N is equal to 16 and M is equal to 8, the initialization program is used to generate $16 \times 8 \times k$ candidate row addresses, e.g. 256 candidate row addresses if k is equal to two, by combining the corresponding page indices and block indices wherein the candidate row addresses can be represented in the following relations:

$$a_{k1} \times 2^{n+(k-1)} + \begin{cases} x_{k1M}, \dfrac{2^{n+(k-1)}}{M} \times (M-1) \leq x_{k1M} < \dfrac{2^{n+(k-1)} \times M}{M} \\ \ldots \\ \ldots \\ x_{k12}, \dfrac{2^{n+(k-1)}}{M} \leq x_{k12} < \dfrac{2^{n+(k-1)} \times 2}{M} \\ x_{k11}, 0 \leq x_{k11} < \dfrac{2^n}{M} \end{cases}$$

$$a_{k2} \times 2^{n+(k-1)} + \begin{cases} x_{k2M}, \dfrac{2^{n+(k-1)}}{M} \times (M-1) \leq x_{k2M} < \dfrac{2^{n+(k-1)} \times M}{M} \\ \ldots \\ \ldots \\ x_{k22}, \dfrac{2^{n+(k-1)}}{M} \leq x_{k22} < \dfrac{2^{n+(k-1)} \times 2}{M} \\ x_{k21}, 0 \leq x_{k21} < \dfrac{2^{n+(k-1)}}{M} \end{cases}$$

$$\ldots$$

$$a_{kN} \times 2^{n+(k-1)} + \begin{cases} x_{kNM}, \dfrac{2^{n+(k-1)}}{M} \times (M-1) \leq x_{kNM} < \dfrac{2^{n+(k-1)} \times M}{M} \\ \ldots \\ \ldots \\ x_{kN2}, \dfrac{2^{n+(k-1)}}{M} \times x_{kN2} < \dfrac{2^{n+(k-1)} \times 2}{M} \\ x_{kN1}, 0 \leq x_{kN1} < \dfrac{2^{n+(k-1)}}{M} \end{cases}$$

wherein $$\frac{2^{n+(k-1)}}{M} \times (j-1) \leq x_{kij} = x_{1ij} \times k + SN_{(k-1)j} < \frac{2^{n+(k-1)}}{M} \times j, \ i = 1, 2, \ldots,$$

N and j=1,2, . . . , M and k=1, . . . , K, and $SN_{(k-1)j}$ comprises multiple different lists of serial numbers which can be identical or cane be respectively different.

By doing so, the finally generated page indices mentioned above are randomly and averagely selected from zero to the size of maximum page number, and correspondingly the initialization program controls the controller 105 to write the boot up information into physical pages corresponding to these candidate row addresses sequentially. The controller 105 does not write the boot up information until the boot up information has been successfully written into pages associated with candidate row addresses belonging to at least one block.

Accordingly, in the above embodiment, the initialization program when initializing the memory device 100 is arranged to write the boot up information into M pages of one or more blocks. For example, the boot up information, used by the processing circuit 115 to obtain the firmware program when the memory device 100 is powered, for example comprises the data amount 4 KB, and one page of one block may be used to store data of 16 KB. That is, in this example, four copies of the boot up information are written into each page. The controller 105 can correctly perform operations after the memory device 100 is powered only if the processing circuit 115 can correctly obtain or read the boot up information from one page among the M pages of one or more blocks to obtain the firmware program.

When the controller 105 is powered after leaving the factory, the processing circuit 115 is used to employ the seed RS1, recorded in the ROM 125, to call the random function to generate identical block indices and also use the seed RS2, recorded in the ROM 125, to call the random function to generate identical page indices, and thus can correspondingly combine block indices with page indices to generate and obtain the identical candidate row addresses sequentially. Then the processing circuit 115 is arranged to retrieve the boot up information sequentially based on one of the candidate row addresses.

Further, when initializing the flash memory 110, the initialization program running on the initialization device 150 may be arranged to ignore a portion of candidate page indices in one embodiment. For example, the processing circuit 115 may generate M×N candidate row addresses for the first round, $$\frac{M \times N}{2}$$

candidate row addresses for the second round wherein the lower half of the M×N candidate row addresses for the second round are discarded, $$\frac{M \times N}{2}$$

candidate row addresses for the third round wherein the lower half of the M×N candidate row addresses for the third round are discarded, and so on. This can effectively improve the system performance.

Figure 2:
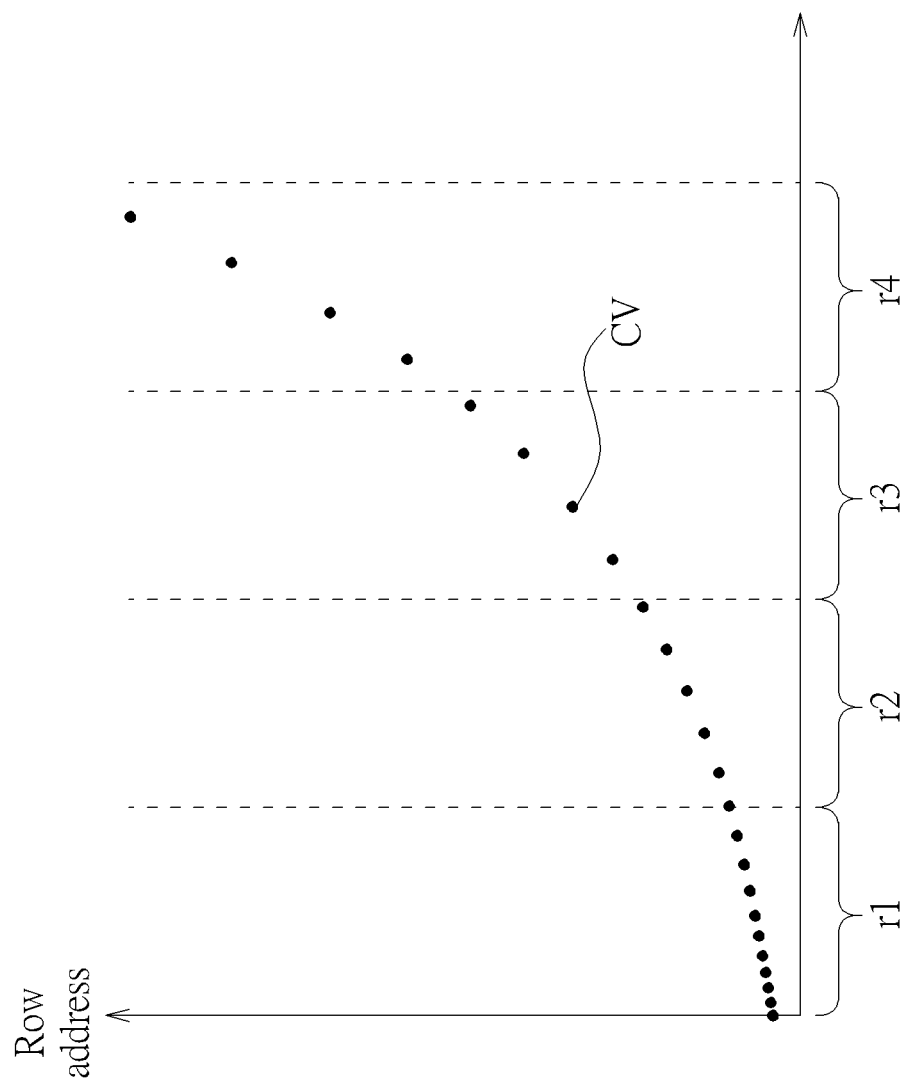
FIG. 2 is a diagram illustrating an example of the candidate row addresses described above according to the embodiment of FIG. 1.

FIG. 2 is a diagram illustrating an example of the candidate row addresses described above according to the embodiment of FIG. 1. As shown in FIG. 2, the dotted curve CV means the different numbers of candidate/golden row addresses generated by the initialization program or generated by the controller 105 when powered for different rounds. For example, the first round r1 corresponds to the M×N candidate row addresses generated for the design of one clock having 128 pages, the second round r2 corresponds to the $$\frac{M \times N}{2}$$

candidate row addresses further generated for the design of one clock having 256 pages, the third round r3 corresponds to the $$\frac{M \times N}{2}$$

candidate row addresses further generated for the design of one clock having 512 pages, the fourth round r4 corresponds to the $$\frac{M \times N}{2}$$

candidate row addresses further generated for the design of one clock having 1024 pages, and so on. The dotted curve CV equivalently form an exponential function curve which means that the row address interval between two candidate row addresses become wider when the design of one block is to include more pages.

Figure 3:
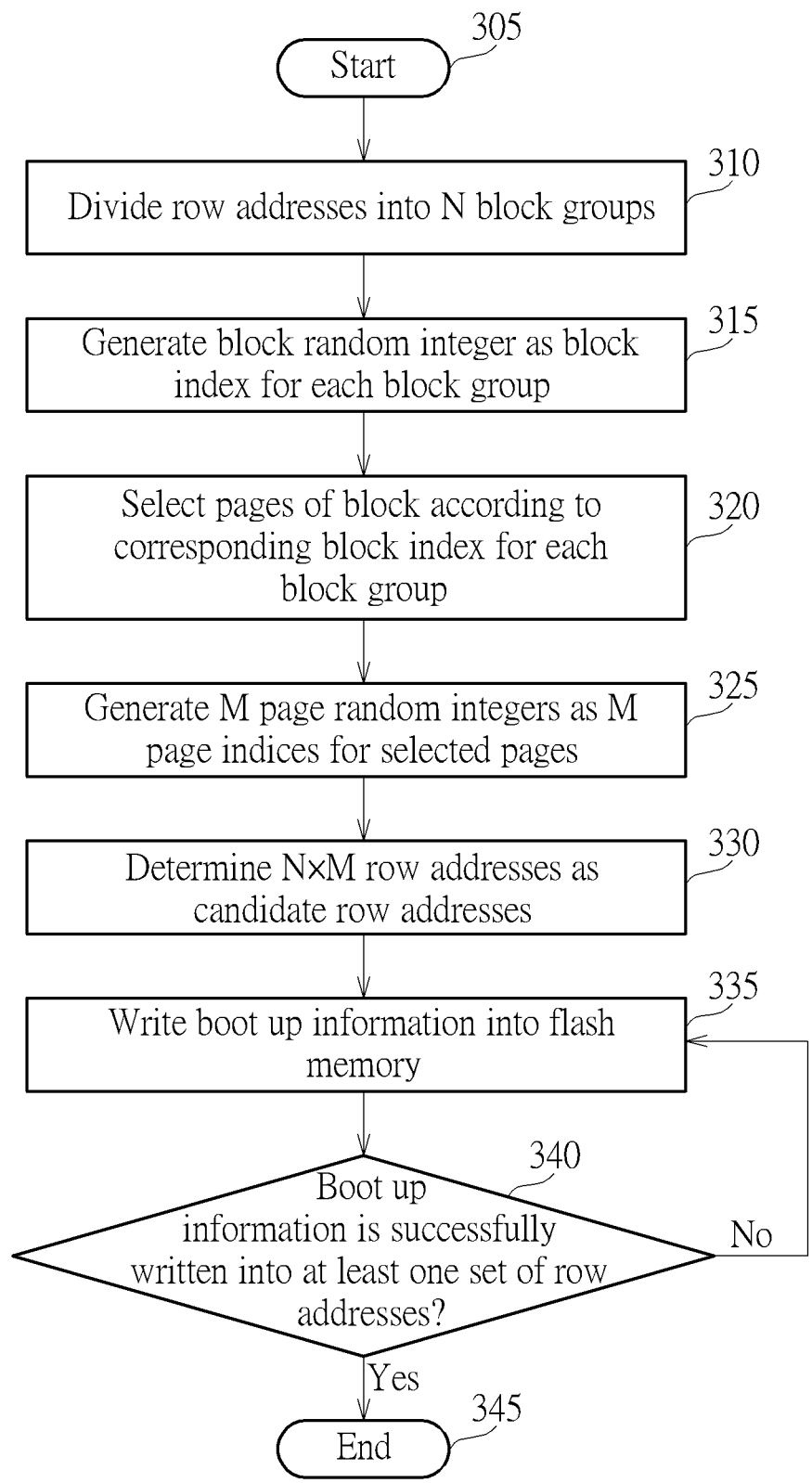
FIG. 3 is a diagram illustrating a flowchart of using the initialization program running on the initialization tool device to initialize the flash memory according to an embodiment of the invention.
Figure 4:
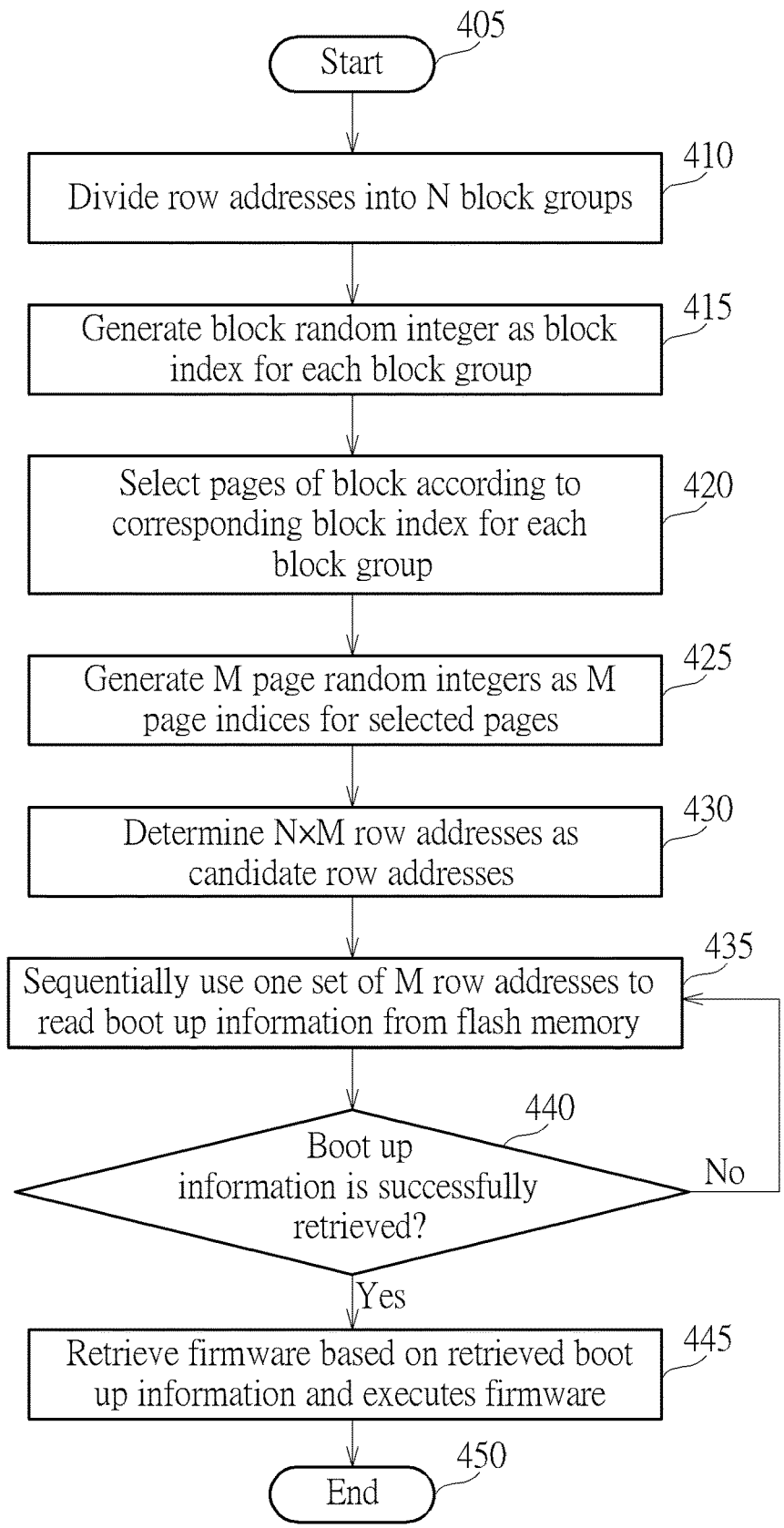
FIG. 4 is a diagram illustrating the operation of the controller when the controller is powered after leaving the factory according to the embodiment of FIG. 3.

To make readers more clearly understand the spirits of the inventions, FIG. 3 and FIG. 4 are provided; corresponding descriptions of steps are not detailed for brevity. FIG. 3 is a diagram illustrating a flowchart of using the initialization program running on the initialization tool device 150 to initialize the flash memory 110 according to an embodiment of the invention. FIG. 4 is a diagram illustrating the operation of the controller 115 when the controller 115 is powered after leaving the factory according to the embodiment of FIG. 3. Provided that substantially the same result is achieved, the steps of the flowchart shown in FIGS. 3 and 4 need not be in the exact order shown and need not be contiguous, that is, other steps can be intermediate. Steps are detailed in the following:

Step 305: Start;

Step 310: Use the initialization program to averagely classify or divide row addresses into N block groups each having a plurality of consecutive row addresses according to the integer of N;

Step 315: Use the initialization program to generate a block random integer as a block index for each of the N block groups;

Step 320: Use the initialization program to select pages of a corresponding block according to a corresponding block index for each block group after obtaining N block indices;

Step 325: Use the initialization program to generate M page random integers as M page indices for the selected pages;

Step 330: Use the initialization program to determine N×M row addresses as the candidate row addresses based on the N block indices and the M page indices corresponding to each block random integer;

Step 335: Use the initialization program to sequentially use one set of M row addresses to write the boot up information into the flash memory 110;

Step 340: Determine whether the boot up information is successfully written into at least one set of row addresses. If yes, the flow proceeds to Step 345; otherwise, the flow proceeds to Step 335; and Step 345: End.

Step 405: Start;

Step 410: The controller averagely classifies or divides row addresses into N block groups each having a plurality of consecutive row addresses according to the integer of N;

Step 415: The controller generates a block random integer as a block index for each of the N block groups;

Step 420: The controller selects pages of a corresponding block according to a corresponding block index for each block group after obtaining N block indices;

Step 425: The controller generates M page random integers as M page indices for the selected pages;

Step 430: The controller determines N×M row addresses as the candidate row addresses based on the N block indices and the M page indices corresponding to each block random integer;

Step 435: The controller sequentially uses one set of M row addresses to read the boot up information from the flash memory 110;

Step 440: Determine whether the boot up information is successfully retrieved. If yes, the flow proceeds to Step 445; otherwise, the flow proceeds to Step 435;

Step 445: The controller retrieves the firmware based on the retrieved boot up information and executes the firmware; and Step 450: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method used by a flash memory initialization device for writing boot up information into a memory device including a controller and a flash memory, comprising:
(a) generating the boot up information at the flash memory initialization device;
(b) using the flash memory initialization device to generate a sequence of N block indices according to a value of a first random seed, which is used as an input to call a random function, to make a block index be generated by randomly selecting an index number among a corresponding subrange of a range from zero to a maximum block index number, a candidate row address being determined by a block index and a page index;
(c) generating M page indices for each of the sequence of N block indices;
(d) correspondingly combining the M page indices with each of the sequence of N block indices to generate M×N candidate row addresses; and
(e) writing the boot up information from the flash memory initialization device into the flash memory by transmitting the boot up information from the flash memory initialization device to the controller and control the controller to write the boot up information into M pages belonging to at least one block sequentially based on the MxN candidate row addresses;

wherein the sequence of N block indices, generated by the flash memory initialization device according to the value of the first random seed used as the input to call the random function, is identical to a same sequence of N block indices regenerated by the controller of the memory device according to the same value of the first random seed used as an input to call the random function; a relation between the value of the first random seed and the sequence of N block indices is associated with one-to-one mapping.

2. The method of claim 1, wherein the step (c) comprises:
generating the M page indices for each of the sequence of N block indices wherein a page index being generated by randomly selecting a page index among a corresponding subrange of a range from zero to a minimum number of page indices.

3. The method of claim 1, wherein the step (b) comprises:
classifying multiple block indices of the flash memory into N block index groups; and
generating a random integer to select a block index from each of the sequence of N block index groups by using the generated random integer, and then generating the sequence of N block indices by using selected block indices.

4. The method of claim 3, wherein the step (c) comprises:
for a block index:
classifying multiple page indices corresponding to the block index into M page index groups; and
generating M random integers, selecting M page indices respectively from the M page index groups by using the M random integers, and then generating the M page indices by using the selected M page indices.

5. The method of claim 1, wherein multiple sets of MxN candidate row addresses are generated by performing the steps (b), (c), and (d) for multiple times, and the boot up information is written into M pages belonging to the at least one block by performing the step (e) sequentially based on the multiple sets of MxN candidate row addresses.

6. The method of claim 5, wherein the step (c) comprises:
for a block index:
classifying multiple page indices corresponding to the block index into M page index groups; and
generating a first set of M random integers, selecting a first set of M page indices respectively from the M page index groups by using the first set of M random integers, and then generating the first set of M page indices by using the first set of M page indices; and
generating a second set of M random integers, selecting a second set of M page indices respectively from the M page index groups by using the second set of M random integers, and then generating the second set of M page indices by using the second set of M page indices;
wherein a value of a page index in the second set of M page indices is equal to a serial number plus at least two times of a value of a page index in the first set of M page indices.

7. A controller to be used in a memory device further having a flash memory, comprising:
a read-only memory (ROM) in which a specific program code has been stored;
a processing circuit, coupled to the ROM, for reading the specific program code when the controller is powered, and for executing the specific program code to:
generate a sequence of N block indices according to a value of a first random seed, which is used as an input to call a random function, to make a block index be generated by randomly selecting an index number among a corresponding subrange of a range from zero to a maximum block index number, a candidate row address being determined by a block index and a page index;
generate M page indices for each of the sequence of N block indices;
correspondingly combine the M page indices with each of the sequence of N block indices to generate MxN candidate row addresses;
sequentially read boot up information from M pages belonging to at least one block based on the MxN candidate row addresses; and
retrieve a firmware program from the flash memory based on the boot up information successfully read out from the at least one block to execute the firmware program;
wherein the sequence of N block indices each time regenerated by the controller of the memory device according to the same value of the first random seed used as an input to call the random function is identical to a same sequence of N block indices, generated by a flash memory initialization device, according to the value of the first random seed used as the input to call the random function; a relation between the value of the first random seed and the sequence of N block indices is associated with one-to-one mapping.

8. The controller of claim 7, wherein, and the processing circuit is used for:
generating the M page indices for each of the sequence of N block indices wherein a page index being generated by randomly selecting a page index among a corresponding subrange of a range from zero to a minimum number of page indices.

9. The controller of claim 7, wherein the processing circuit is arranged for:
classifying multiple block indices of the flash memory into N block index groups; and
generating a random integer to select a block index from each of the N block index groups by using the generated random integer, and then generating the sequence of N block indices by using selected block indices.

10. The controller of claim 9, wherein the processing circuit is used for:
for a block index:
classifying multiple page indices corresponding to the block index into M page index groups; and
generating M random integers, selecting M page indices respectively from the M page index groups by using the M random integers, and then generating the M page indices by using the selected M page indices.

11. The controller of claim 7, wherein the processing circuit is used for generating multiple sets of MxN candidate row addresses, and is used for reading the boot up information from M pages belonging to the at least one block sequentially based on the multiple sets of MxN candidate row addresses.

12. The controller of claim 11, wherein the processing circuit is used for:

for a block index:
classifying multiple page indices corresponding to the block index into M page index groups; and
generating a first set of M random integers, selecting a first set of M page indices respectively from the M page index groups by using the first set of M random integers, and then generating the first set of M page indices by using the first set of M page indices; and
generating a second set of M random integers, selecting a second set of M page indices respectively from the M page index groups by using the second set of M random integers, and then generating the second set of M page indices by using the second set of M page indices;
wherein a value of a page index in the second set of M page indices is equal to a serial number plus at least two times of a value of a page index in the first set of M page indices.

13. A method utilized in a controller to be used in a memory device further having a flash memory, comprising:
providing a read-only memory (ROM) in which a specific program code has been stored;
reading the specific program code and the first seed when the controller is powered; and
executing the specific program code to:
generate a sequence of N block indices according to a value of a first random seed, which is used as an input to call a random function, to make a block index be generated by randomly selecting an index number among a corresponding subrange of a range from zero to a maximum block index number, a candidate row address being determined by a block index and a page index;
generate M page indices for each of the sequence of N block indices;
correspondingly combine the M page indices with each of the sequence of N block indices to generate M×N candidate row addresses;
sequentially read boot up information from M pages belonging to at least one block based on the M×N candidate row addresses; and
retrieve a firmware program from the flash memory based on the boot up information successfully read out from the at least one block to execute the firmware program;
wherein the sequence of N block indices each time regenerated by the controller of the memory device according to the same value of the first random seed used as an input to call the random function is identical to a same sequence of N block indices, generated by a flash memory initialization device, according to the value of the first random seed used as the input to call the random function; a relation between the value of the first random seed and the sequence of N block indices is associated with one-to-one mapping.

14. The method of claim 13, wherein the step of generating the M page indices comprises:
generating the M page indices for each of the sequence of N block indices wherein a page index being generated by randomly selecting a page index among a corresponding subrange of a range from zero to a minimum number of page indices.

15. The method of claim 13, wherein the step of generating the N block indices comprises:
classifying multiple block indices of the flash memory into N block index groups; and
generating a random integer to select a block index from each of the sequence of N block index groups by using the generated random integer, and then generating the sequence of N block indices by using selected block indices.

16. The method of claim 15, wherein the step of generating the M page indices comprises:
for a block index:
classifying multiple page indices corresponding to the block index into M page index groups; and
generating M random integers, selecting M page indices respectively from the M page index groups by using the M random integers, and then generating the M page indices by using the selected M page indices.

17. The method of claim 13, further comprising:
generating multiple sets of M×N candidate row addresses; and
reading the boot up information from M pages belonging to the at least one block sequentially based on the multiple sets of M×N candidate row addresses.

18. The method of claim 17, further comprising:
for a block index:
classifying multiple page indices corresponding to the block index into M page index groups;
generating a first set of M random integers, selecting a first set of M page indices respectively from the M page index groups by using the first set of M random integers, and then generating the first set of M page indices by using the first set of M page indices; and
generating a second set of M random integers, selecting a second set of M page indices respectively from the M page index groups by using the second set of M random integers, and then generating the second set of M page indices by using the second set of M page indices;
wherein a value of a page index in the second set of M page indices is equal to a serial number plus at least two times of a value of a page index in the first set of M page indices.

* * * * *